United States Patent [19]

Kleijne et al.

[11] Patent Number: 4,691,350

[45] Date of Patent: * Sep. 1, 1987

[54] SECURITY DEVICE FOR STORED SENSITIVE DATA

[75] Inventors: Theodoor A. Kleijne, Dreumel; Jan B. Goossens, De Bilt, both of Netherlands

[73] Assignee: NCR Corporation, Dayton, Ohio

[*] Notice: The portion of the term of this patent subsequent to Jun. 3, 2003 has been disclaimed.

[21] Appl. No.: 877,049

[22] Filed: Jun. 23, 1986

[30] Foreign Application Priority Data

Oct. 30, 1985 [GB] United Kingdom ............... 8526689

[51] Int. Cl.$^4$ .............................................. H04L 9/00
[52] U.S. Cl. .......................................... 380/3; 380/4; 380/52; 380/59
[58] Field of Search ................ 307/200 A, 202.1; 235/451; 178/22.08; 380/3, 4, 52, 59, 23, 25

[56] References Cited

U.S. PATENT DOCUMENTS

| | | | |
|---|---|---|---|
| 3,643,609 | 2/1972 | Maywald et al. | 307/202.1 |
| 3,666,967 | 5/1972 | Keister et al. | 307/202.1 |
| 3,697,668 | 10/1972 | Campbell | 307/202.1 |
| 3,725,671 | 4/1973 | Keister et al. | 307/202.1 |
| 3,740,277 | 6/1973 | Poulin et al. | 307/202.1 |
| 3,786,282 | 1/1974 | Orndorff | 307/200 A |
| 3,882,323 | 5/1975 | Smolker | 307/202.1 |
| 3,882,324 | 5/1975 | Smolker et al. | 307/202.1 |
| 3,906,460 | 9/1975 | Halpern | 178/22.08 |
| 4,105,156 | 8/1978 | Dethloff | 235/487 |
| 4,295,041 | 10/1981 | Ugon | 235/487 |
| 4,375,601 | 3/1983 | Van Vliet | 307/200 A |
| 4,394,702 | 7/1983 | Boothe | 307/200 A |
| 4,520,418 | 5/1985 | Susi | 307/200 A |
| 4,591,945 | 5/1986 | Ugon | 235/451 |
| 4,593,384 | 6/1986 | Kleijne | 307/202.1 |

Primary Examiner—Salvatore Cangialosi
Assistant Examiner—Aaron J. Lewis
Attorney, Agent, or Firm—Wilbert Hawk, Jr.; Albert L. Sessler, Jr.; Richard W. Lavin

[57] ABSTRACT

A security device (10) contains electronic circuitry (84) including a resettable memory (110) which stores sensitive data. The device (10) includes a housing (11) formed by six ceramic plates (P1-P6) each having provided thereon a pair of serially connected conductive path segments formed in separate, superposed layers and arranged in complementary winding configurations. Between the conductive path segments is disposed a conductive sheet. The conductive path segments are serially interconnected by interconnection blocks (N1-N7) and the conductive sheets are serially interconnected by further interconnection blocks (N8-N14). If an attempt to penetrate the housing results in either of the conductive path segments being interrupted or shorted to the conductive sheet, a reset signal is generated to reset the resettable memory (110) thereby erasing the sensitive data stored therein.

9 Claims, 27 Drawing Figures

SECURITY DEVICE FOR STORED SENSITIVE DATA

BACKGROUND OF THE INVENTION

1. Field of Invention

This invention relates to a security device and more particularly to a housing constructed to prevent external access to sensitive data stored therein.

2. Description of the Prior Art

Several known prior art techniques have been proposed for the construction of a housing which prevents access to the sensitive data stored therein.

International patent application No. WO-84/04614 discloses a data security device which includes a container formed of a brittle material such as prestressed glass and which includes a data processor, a volatile CMOS RAM memory device for storing encryption key data, and a battery forming the power supply for the memory device. The container consists of a housing and a lid. The battery is connected to the memory device by a power supply conductor formed in a winding path configuration on the interior surfaces of the housing and the lid, the parts of the power supply conductor on the housing and lid being connected by pairs of contacts at the joint faces between the housing and the lid. The conductor is formed by an evaporated metal thin film material. The power supply conductor pattern is bifilar and the parts of the conductor are interleaved with additional conductors on the interior surfaces of the housing and lid which are earthed or connected to a voltage source. Thus, if the power supply conductor is interrupted or connected to either of the additional conductors the power supply to the volatile RAM would be so much altered that the data in the RAM would be destroyed. The known device has the disadvantage of a relatively low level of security since the width of the power supply conductor provided on the housing must be maintained sufficiently great to enable the provision of an adequate power supply to the memory device. Such relatively wide conductors are subject to the possibility of penetration. For example, it could be possible to produce a hole of sufficiently small diameter to maintain a conductive path in a relatively wide power supply conductor, yet enable unauthorized access to the memory device via the hole. Furthermore, the thin film technology utilized in the manufacture of the known device results in high device cost.

German Offenlegungsschrift No. 3023427 discloses a mobile data storage unit which includes a plurality of memory devices within a closed container formed by a housing and a lid. Located within the material forming the walls of the container are a plurality of differential pressure sensing devices connected to closed channels also located in the walls of the container, such that any attempt to break into the container which disrupts the pressure in the closed channels is detected by the pressure sensing devices and causes the operation of a relay to provide an erase signal to erase the contents of the memory devices. Also located within the material forming the walls of the container are a pair of thin conductors, which run in an arbitrary configuration through the housing and the lid, and are connected to a power source and the relay. Any external influence which breaks either of these thin conductors also causes the relay to provide an erase signal to erase the contents of the memory devices. However, this known device is of complex and expensive construction resulting from the provision of the closed channels and pressure sensing devices. Furthermore, the possibility exists of forming a small diameter hole into the interior of the unit without interrupting either of the pair of thin conductors. This, the degree of security achievable with this known unit is also limited.

It is thus an object of the present invention to provide a data security device wherein the aforementioned disadvantages are alleviated.

SUMMARY OF THE INVENTION

This and other objects of the invention are fulfilled by providing a security device for protecting stored sensitive data which includes a closed housing containing memory means adapted to store sensitive data, wherein said housing embodies conductive path means and conductive sheet means, wherein said conductive path means includes a plurality of interconnected first and second conductive path segments, wherein said conductive sheet means includes a plurality of interconnected conductive sheets, wherein each first conductive path segment, and associated second conductive path segment and an associated conductive sheet are arranged in superposed relationship and are separated by insulating material, and wherein said conductive path means and said conductive sheet means are connected to tamper detection circuitry including reset signal generating means arranged to provide a reset signal to erase the contents of said memory means in the event of interruption of said conductive path means or electrical interconnection between said conductive path means and said conductive sheet means brought about by an attempt to penetrate said housing.

BRIEF DESCRIPTION OF THE DRAWINGS

The foregoing and various other objects, advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
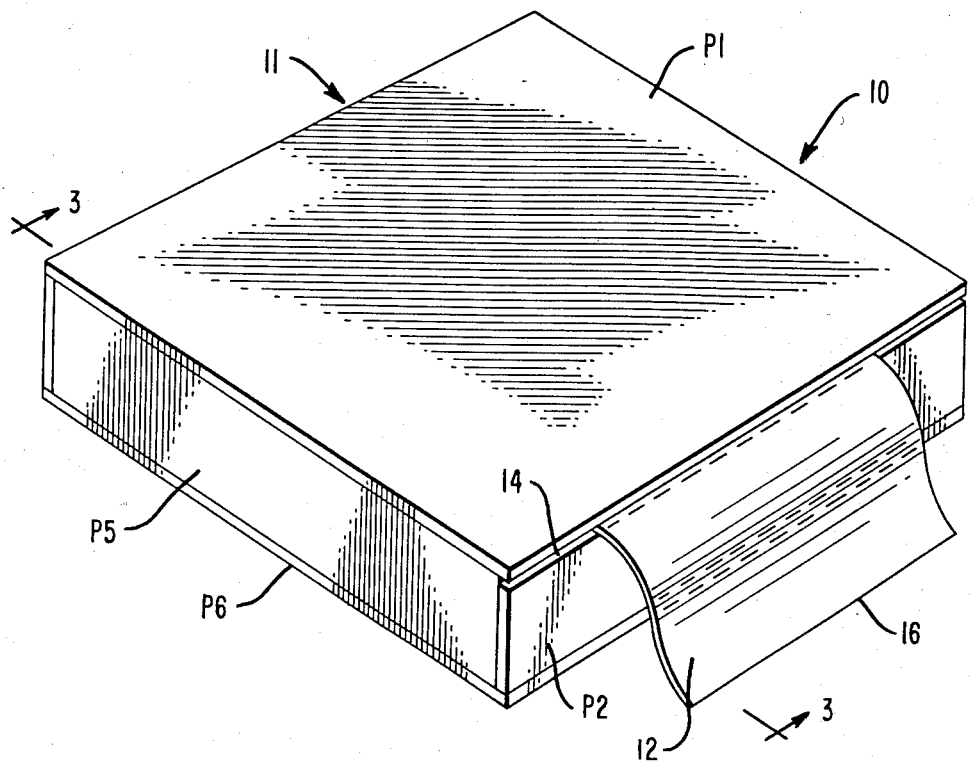
FIG. 1 is a perspective view of a security device according to the present invention.
Figure 2:
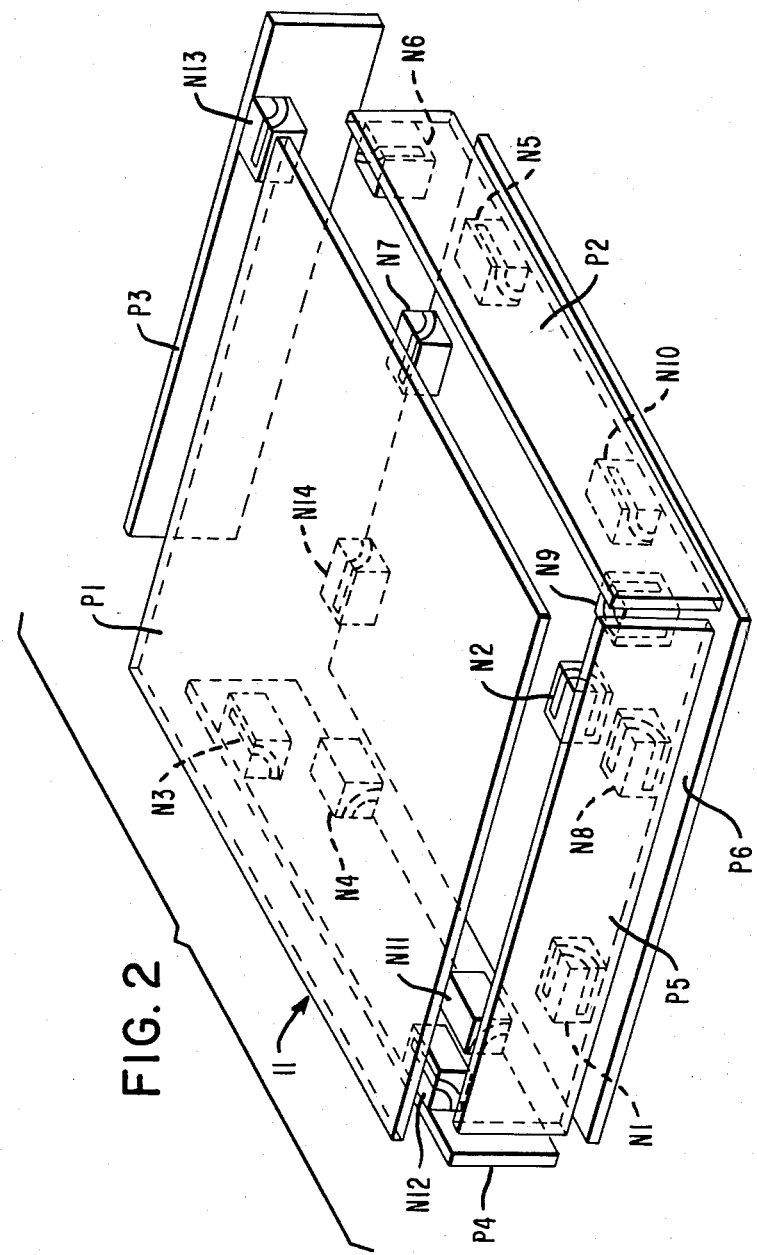
FIG. 2 is an exploded perspective view of the security device shown in FIG. 1, showing the location of interconnection blocks utilized in the device.

Referring first to FIGS. 1 and 2 of the drawings, a security device 10 according to the invention is shown which includes a housing 11 formed by a top plate P1, side plates P2-P5 and a base plate P6. The six plates P1-P6 are preferably formed of a ceramic material since ceramic material is highly resistant to chemical attack. Included within the housing 11 is electronic circuitry (not shown in FIGS. 1 and 2) electrically connected to conductors (not shown) on a flexible printed circuit member 12 which extends through a narrow gap 14 provided between the plates P1 and P2. Since the flexible printed circuit member 12 is very thin, typically having a thickness of about 140 microns only, the height of the narrow gap 14 is correspondingly very small and hence the narrow gap 14 is difficult to penetrate. The outer edge 16 of the flexible member 12 may be attached to a rigid printed circuit extension (not shown) for connection to other circuit elements in the environment in which the security device 10 is utilized. Also shown in FIG. 2 as located within the housing 11 are interconnection blocks N1-N14, the purpose of which will be explained hereinafter.

Figure 3:
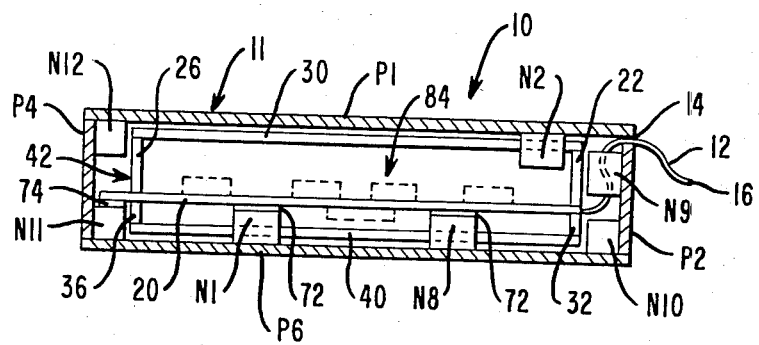
FIG. 3 is an end view of the security device shown in FIG. 1, with the front side plate removed.
Figure 4:
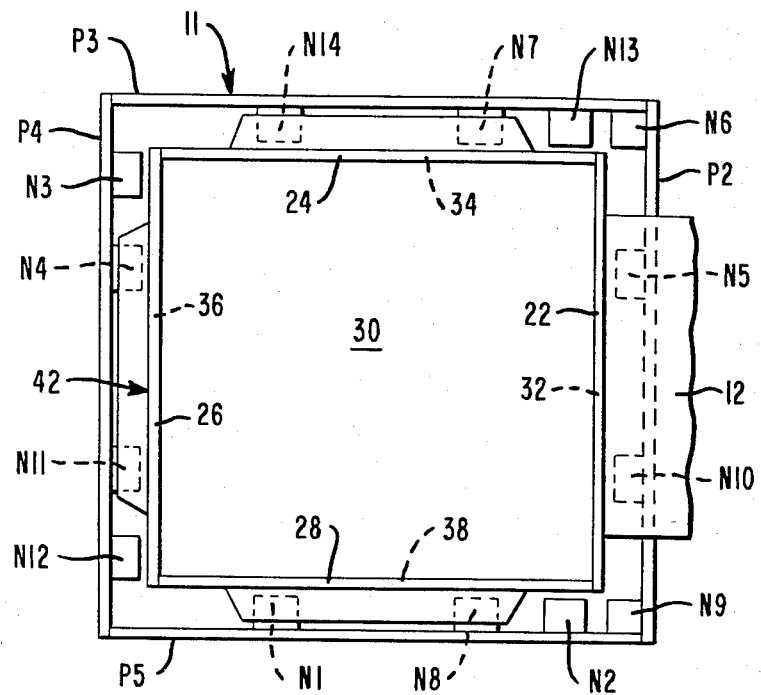
FIG. 4 is a plan view of the security device shown in FIG. 1, with the top plate removed.

Referring to FIG. 3, there is shown an end view of the security device 10 looking in the direction of the arrows 3—3 in FIG. 1, with the front plate P5, removed. Within the housing 11 of the security device 10, there is disposed a printed circuit board (PCB) 20. Referring to FIG. 3 and also to the top view shown in FIG. 4, ceramic plates 22, 24, 26, 28 are mounted on the upper side of the PCB 20 and a further ceramic plate 30 is mounted on the upper edges of the plates 22-28. Mounted on the lower side of the PCB 20 are ceramic plates 32, 34, 36 and 38 in locations corresponding to the locations of the plates 22, 24, 26 and 28. The locations of the plates 32, 34, 36 and 38 are indicated by dashed line references in FIG. 4. Mounted on the lower edges of the plates 32, 34, 36 and 38 is a further ceramic plate 40. The ten plates 22-40 together form an inner ceramic box 42 which provides additional security for electronic circuitry 84, the general location of which is shown by dashed line rectangles in FIG. 3. It is to be noted that the components of the electronic circuitry 84 are mounted on both sides of the PCB 20. It will be appreciated that even if it were possible to penetrate the housing 11 with a very small diameter hole, it would still be necessary to penetrate the inner ceramic box 42 to obtain access to the electronic circuitry 84.

Figure 5:
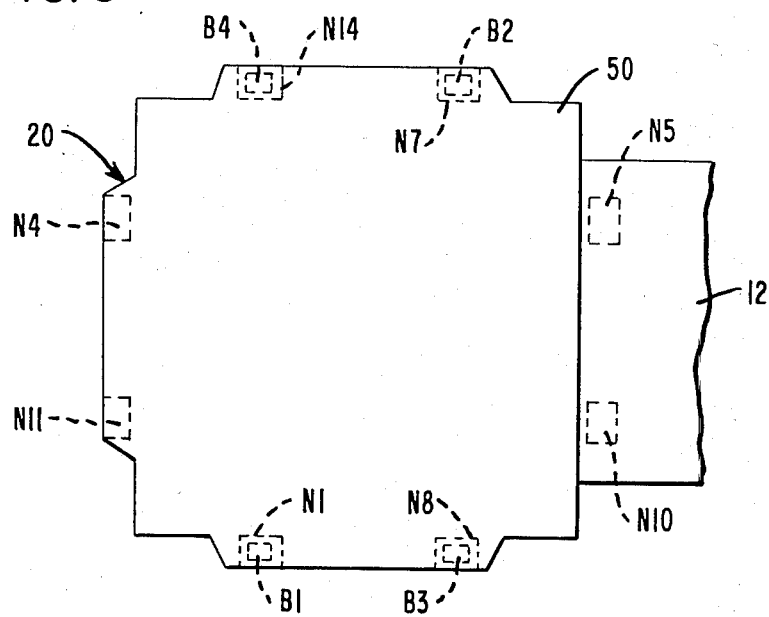
FIG. 5 is a top view of a printed circuit board utilized in the security device.

Referring to FIG. 5, a top view of the PCB 20 is shown. The PCB 20 is a rigid structure which is formed by two rigid members (only the upper rigid member 50 being shown in FIG. 5), between which is sandwiched a flexible member (not shown) of which the flexible printed circuit member 12 forms an extension. The PCB 20 incorporates conventional electrical conductors (not shown) whereby electrical connections are made between the circuit elements with which the PCB is associated, including the electronic circuitry 84 and conductive path segments and conductive sheets on the respective plates P1-P6, as will be fully described hereinafter.

The PCB 20 is supported on interconnection blocks N1, N4, N7, N8, N11 and N14 by intermediate spacers 72, 74, FIG. 3, which may be formed of a resilient material such as rubber and which serves to compensate for any difference in the thermal expansion of ceramic material and the material of which the PCB is formed.

Each of the six plates P1-P6 forming the housing 11 has provided on the inner surface thereof, in respective superposed layers separated by insulating material, a first conductive path segment arranged in a winding configuration, a conductive sheet, and a second conductive path segment arranged in a winding configuration complementary to the winding configuration of the first conductive path, as will be explained in more detail hereinafter. The conductive path segments on each plate are serially connected to form a wire mesh segment associated with the plate.

The manner in which the conductive path segments and the conductive sheet are formed and disposed on a typical one of the plates will now be described in detail with reference to FIGS. 6A-6L inclusive, 7 and 8.

Figure 6A:
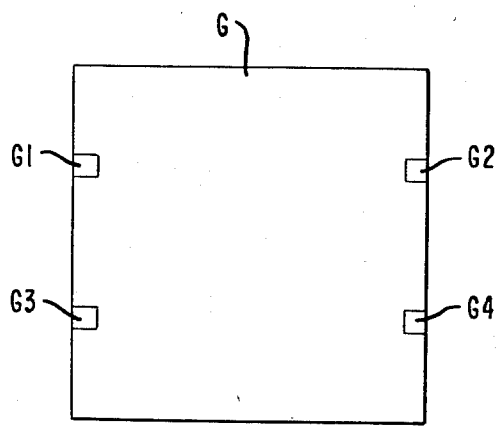
FIGS. 6A-6L show, schematically, and on a reduced scale, the arrangement of conductive and insulating layers which are superposed on the interior surfaces of the plates forming the housing of the security device.
Figure 6B:
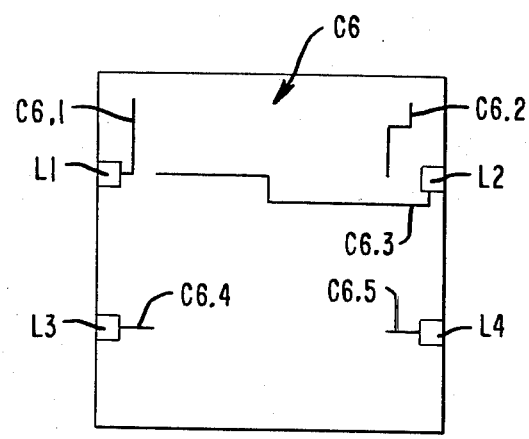
Figure 6C:
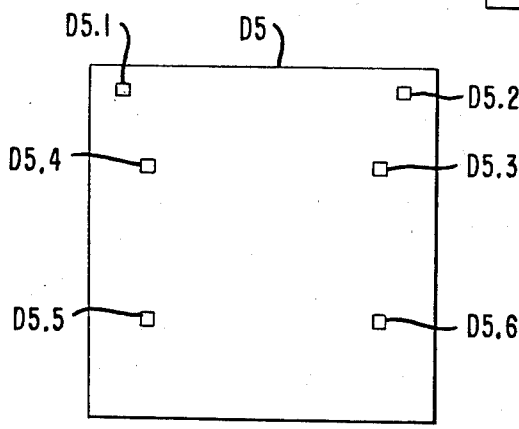
Figure 6D:
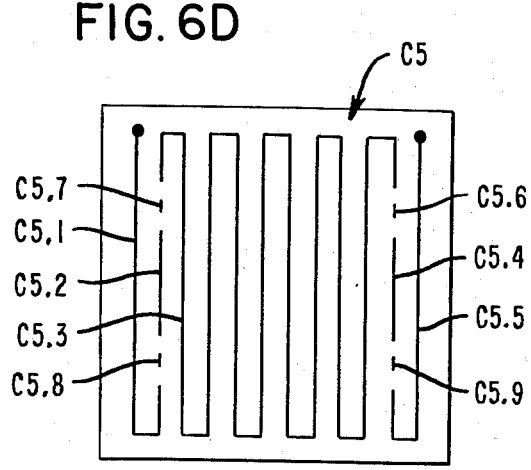
Figure 6E:
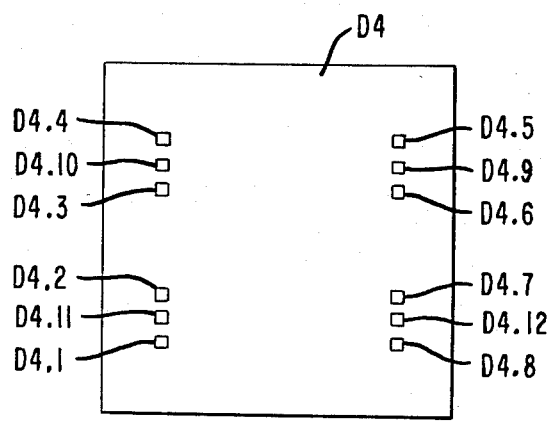
Figure 6F:
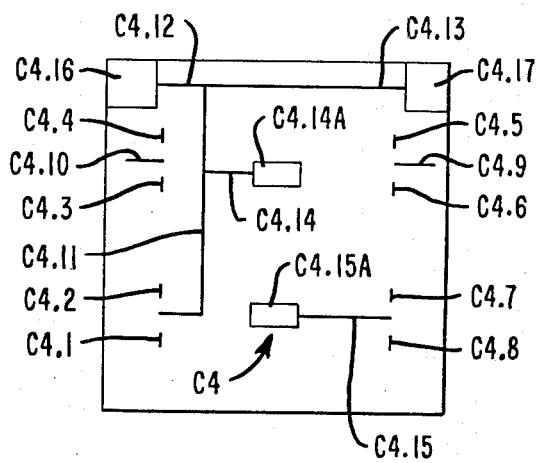
Figure 6G:
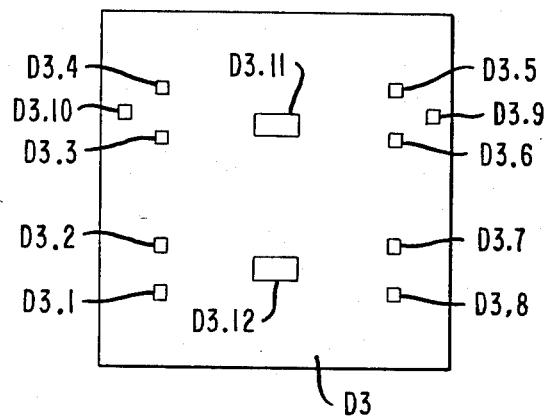
Figure 6H:
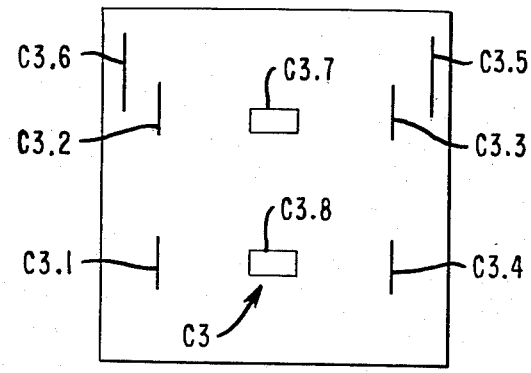
Figure 6I:
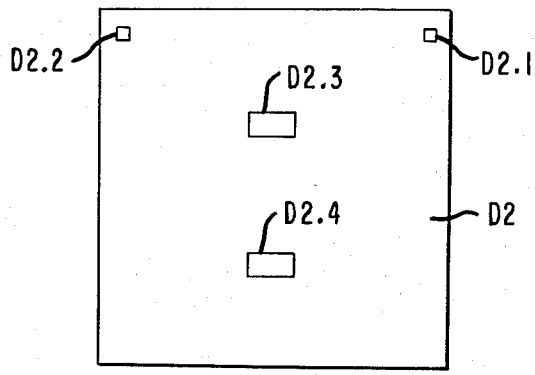
Figure 6J:
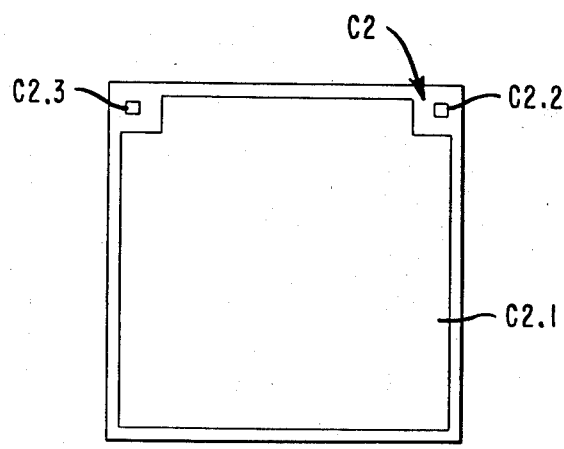
Figure 6K:
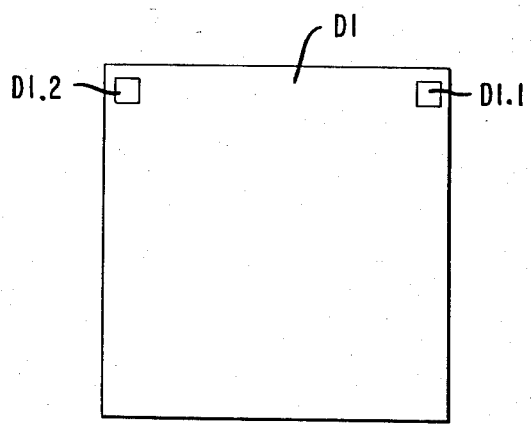
Figure 6L:
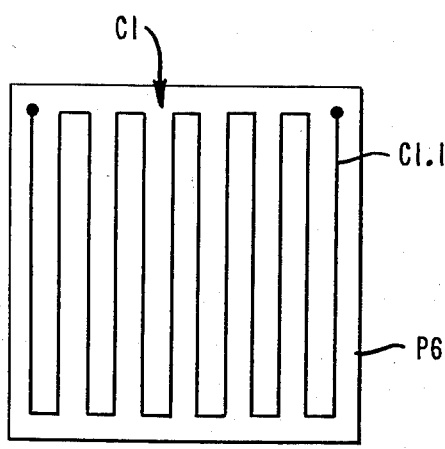

It should first be understood that FIGS. 6A-6L inclusive represent insulating and conductive layers which are superposed on the inner surface of the plate, with FIG. 6A representing an uppermost layer, which is of insulating glass, and FIG. 6L representing a lowermost layer, which is of conductive material. The various insulator and conductive layers are formed by conventional thick film deposition techniques. Such techniques are well known and will not be described here. Suffice it to say that for each conductive and insulating layer a different screen is prepared and used to deposit an associated conductive or insulating paste. After each screening the layered plate is heated to about 800° C. to fire or harden the deposited paste. The thickness of the conductive layer formed in this manner is in the range of from about 10 microns to about 15 microns.

Referring now to FIGS. 6A-6L inclusive, FIG. 6A represents a glass layer G having holes G1-G4 6formed therein; FIG. 6B represents a conductive layer C6 underlying the glass layer G and including conductive islands L1-L4 and conductive lines C6.1-C6.5; FIG. 6C represents a dielectric layer D5 underlying the conductive layer C6, and containing holes D5.1-D5.6; FIG. 6D represents a conductive layer C5 underlying the dielectric layer D5 and including conductive lines and regions C5.1-C5.9; FIG. 6E represents a dielectric layer D4 underlying the conductive layer C5 and containing holes D4.1-D4.12; FIG. 6F represents a conductive layer C4 underlying the dielectric layer D4 and including conductive lines, and areas C4.1-C4.17; FIG. 6G represents a dielectric layer D3 underlying the conductive layer C4 and containing holes D3.1-D31.2; FIG. 6H represents a conductive layer C3 underlying the dielectric layer D3 and containing conductive lines and areas C3.1-C3.8; FIG. 6I represents a dielectric layer D2 underlying the conductive layer C3 and containing holes D2.1-D2.4; FIG. 6J represents a conductive layer C2 underlying the dielectric layer D2 and including conductive areas C2.1–C2.3; FIG. 6K represents a dielectric layer D1 underlying the conductive layer C2 and containing holes D1.1 and D1.2; and FIG. 6L represents a lowermost conductive layer C1 formed on the inner surface of the plate.

Figure 7:
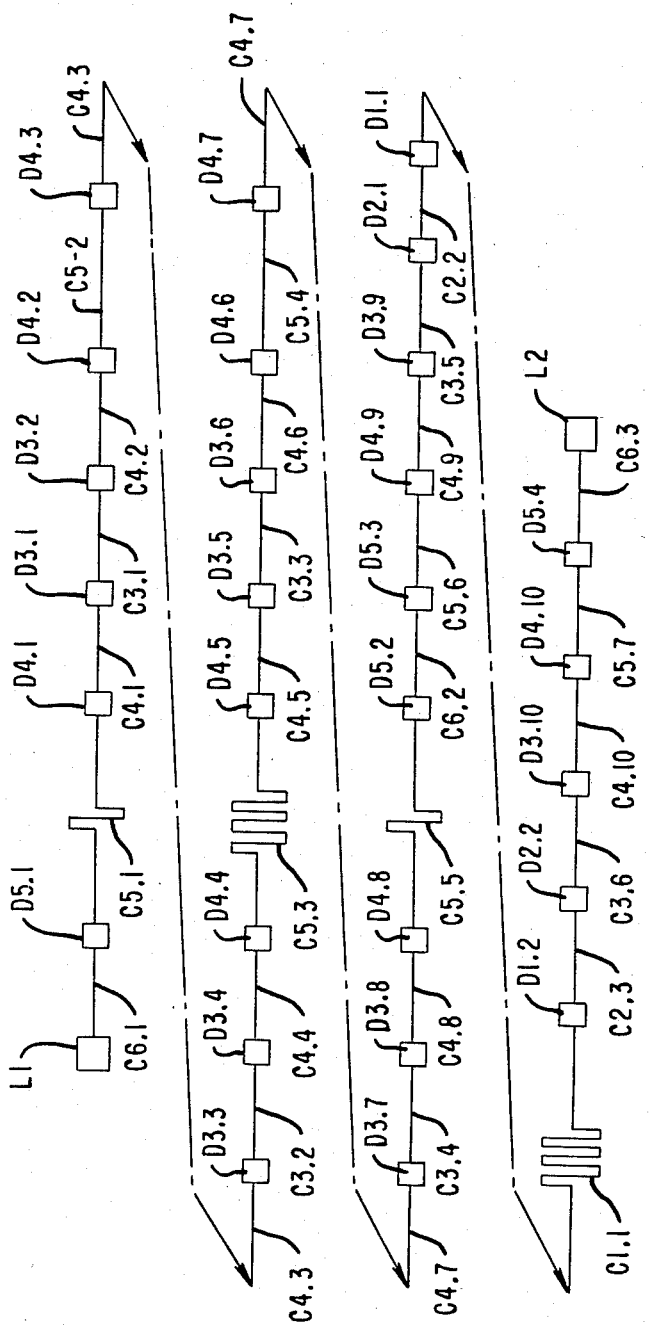
FIG. 7 is a schematic diagram showing the manner in which certain connections are made between the conductive layers and through the insulating layers shown in FIGS. 6A-6L.

Referring to FIGS. 6A–6L inclusive, taken in conjunction with FIG. 7, the course of the conductive path segments and their interconnections will be described, commencing from the conductive island L1 and terminating at the conductive island L2, it being appreciated that contact is made to the conductive islands L1 and L2 through the holes G1 and G2 in the glass layer G, FIG. 6A. Thus, from the conductive island L1, the conductive path continues via the line C6.1, through the hole D5.1, along the conductive line C5.1, through the hole D4.1, via the conductive region C4.1, through the hole D3.1, along the conductive line C3.1, through the hole D3.2, via the conductive region C4.2, through the hole D4.2, along the conductive line C5.2, through the hole D4.3, via the conductive region C4.3, through the hole D3.3, along the conductive line C3.2, through the hole D3.4, via the conductive region C4.4, through the hole D4.4, along the conductive line C5.3, through the hole D4.5, via the conductive region C4.5, through the hole D3.5, along the conductive line C3.3, through the hole D3.6, via the conductive region C4.6, through the hole D4.6, along the conductive line C5.4, through the hole D4.7, via the conductive region C4.7, through the hole D3.7, along the conductive line C3.4, through the hole D3.8, via the conductive region C4.8, through the hole D4.8, along the conductive line C5.5, through the hole D5.2, along the conductive line C6.2, through the hole D5.3, via the conductive region C5.6, through the hole D4.9, via the conductive line C4.9, through the hole D3.9, along the conductive line C3.5, through the hole D2.1, via the conductive region C2.2, through the hole D1.1, along the conductive line C1.1, through the hole D1.2, via the conductive region C2.3, through the hole D2.2, along the conductive line C3.6, through the hole D3.10, along the conductive line C4.10, through the hole D4.10, via the conductive region C5.7, through the hole D5.4, and along the conductive line C6.3 to the conductive island L2.

It will be appreciated that the conductive lines C5.1–C5.5, C3.1–C3.4 considered together form a first conductive path segment conveniently referred to by the acronym CPS1 and that the conductive line C1.1 forms a second conductive path segment conveniently referred to by the acronym CPS2, the two segments being serially connected.

Referring to FIGS. 6A–6L inclusive, taken in conjunction with FIG. 8, the location and interconnections of the conductive sheet will now be described, commencing from the conductive island L3 and terminating at the conductive island L4, it being appreciated that contact is made to the conductive islands L3 and L4 through the holes G3 and G4 in the glass layer G, FIG. 6A. Thus, from the conductive island L3, the interconnection continues along the conductive line C6.4 through the hole D5.5, via the conductive region C5.8, through the hole D4.11, via the conductive line C4.11 to the conductive lines C4.12 and C4.13 which connect respectively to conductive areas C4.16 and C4.17 which form portions of the conductive sheet. The interconnection also continues from the conductive line C4.11 via the conductive line C4.14 to the conductive region C4.14A, through the hole D3.11, via the conductive region C3.7, through the hole D2.3 to the conductive sheet portion C2.1, and thence through the hole D2.4, via the conductive region C3.8, through the hole D3.12, via the conductive region C4.15A and the conductive line C4.15, through the hold D4.12 via the conductive region C5.9, through the hole D5.6, and along the conductive line C6.5 to the conductive island L4.

Figure 8:
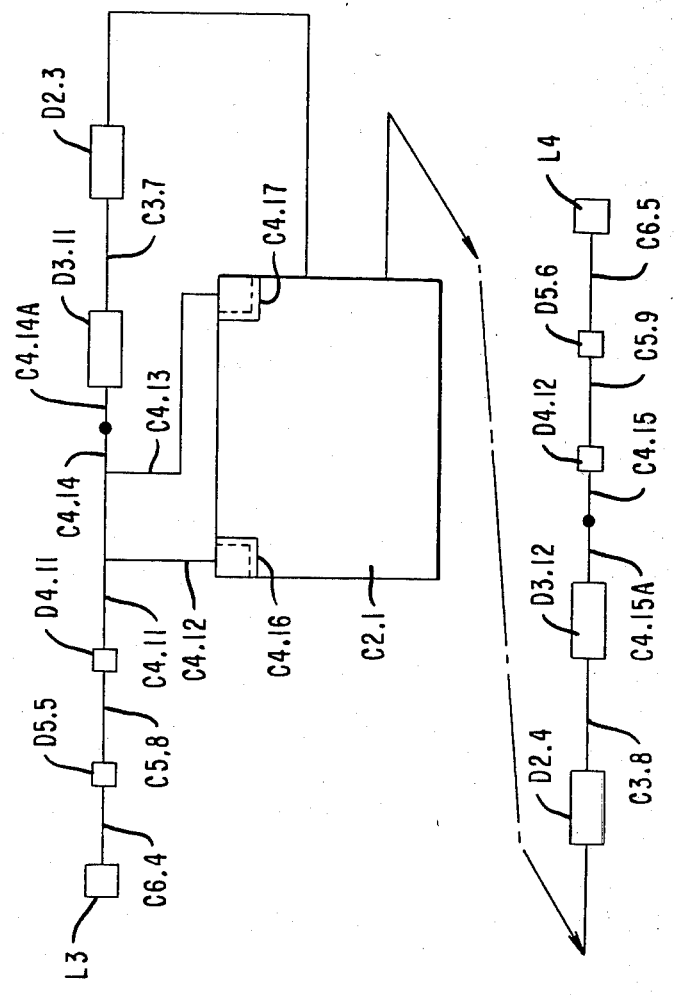
FIG. 8 is a schematic diagram showing the manner in which additional connections are made between the conductive layers and through the insulating layers shown in FIGS. 6A-6L.

It will be appreciated that the conductive areas C2.1, C4.16 and C4.17 considered together form the conductive sheet, it being noted that the areas C4.16, C4.17 overlap the cut-away corners of the area C2.1, as is best seen in FIG. 8.

It should be understood that layers having identical configurations to the layers shown in FIGS. 6A–6L inclusive are formed on all the plates, although the actual shape of the plates P2–P5 is, of course, rectangular rather than square. The only exception is that the configurations of the uppermost conductive layer, including the location of the islands L1–L4, FIG. 6B, and the corresponding uppermost glass layer G, FIG. 6A, will vary from plate to plate to enable interconnections to be made with the islands L1–L4 at appropriate locations on the individual plates P1–P6.

It should be noted that the various conductive lines of the conductive layers C1, C3–C6 shown schematically in FIGS. 6A–6L are formed to a width of approximately 300 microns and that the spacing between the windings in the layers C1 and C5 is also about 300 microns. It should also be understood that the first and second conductive path segments CPS1, CPS2 are arranged in winding configurations in complementary fashion relative to each other, that is, the windings of the first conductive path segment CPS1 overlie the spaces between the windings of the second conductive path segment, CPS2, and the spaces between the windings of the first conductive path segment CPS1 overlie the windings of the second conductive path segment CPS2. The serially connected conductive path segments CPS1, CPS2 on each plate together constitute a wire mesh segment for that plate. Also, the conductive area C2.1 of the conductive layer C2 and the conductive areas C4.16 and C4.17 of the conductive layer C4 together form a conductive sheet.

The manner in which the security device 10 is assembled will now be briefly described. The six plates P1–P6 are first prepared and the conductive and insulating layers described with reference to FIGS. 6A–6L inclusive are provided thereon. The plates P1–P5 together with the interconnection blocks N1–N14 are then assembled using epoxy bonding. The PCB 20, together with the inner ceramic box 42 thereon is then assembled and conductively bonded using conductive spacers 72 to the interconnection blocks N1, N7, N8 and N14 and non-conductively bonded using the non-conductive spacers 74 to the interconnection blocks N4 and N11. The flexible printed circuit member 12 is passed over the top of the plate P2. Finally, the plate P1 is placed on the assembly. The plate P1 is bonded to the top edges of the plates P2 to P5 and the flexible printed circuit member 12 using epoxy bonding, which also fills the gap 14 between the plates P1 and P2. The plate P1 is also conductively bonded to the interconnection blocks N2, N3, N12 and N13. At all corners and edges of the device 10, non-conductive epoxy (not shown) is added for additional mechanical strength.

It will be appreciated that, with the described arrangement, if an attempt is made to penetrate the housing 11, by forming a small hole through one of the plates P1-P6, such hole will penetrate at least one of the conductive path segments on the plate and will penetrate the conductive sheet on the plate. This provides a very high degree of security for the sensitive data stored in the device 10, as will be explained hereinafter. Further, such high degree of security is achieved while using relatively low-cost thick film technology.

The manner in which the wire mesh segments and the conductive sheets on the six plates P1-P6 are interconnected will now be described with particular reference to FIGS. 9, 10A and 10B. The interconnections are effected using fourteen interconnection blocks N1-N14. Referring briefly to FIG. 11, a typical interconnection block N1 is shown. The block N1 is a ceramic block, having six plane surfaces. On three adjacent surfaces 40, 42 and 44 there are disposed respective conductive areas 46, 48 and 50 formed by conventional thick film deposition techniques such that a conductive path is formed between the conductive areas 46 and 50 via the conductive area 48. The areas 46 and 50 are of rectangular shape and the area 48 is of part-annular shape. This configuration for the conductive areas 46, 48 and 50 provides additional security when the interconnection block is in position within the housing 11, as will be explained more fully hereinafter.

Figure 9:
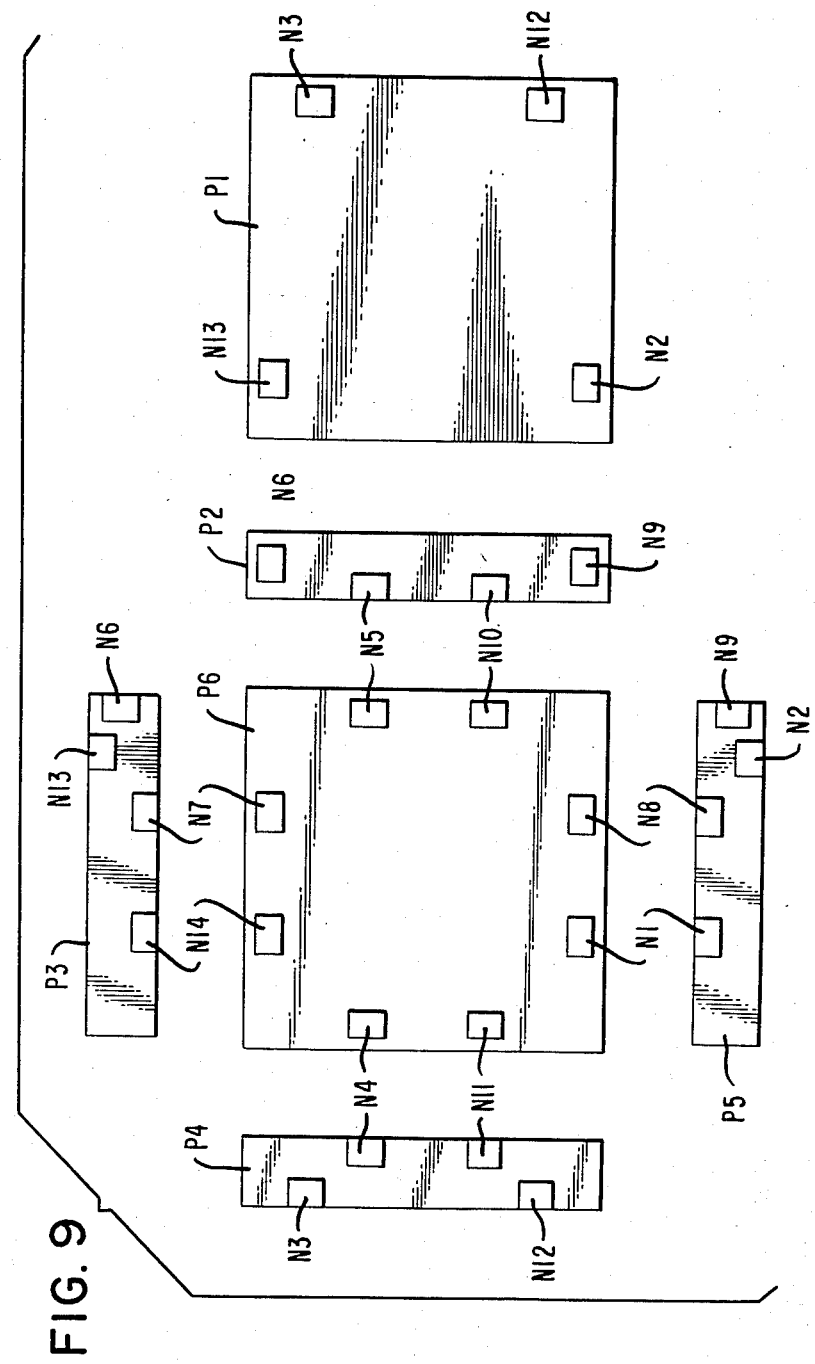
FIG. 9 is a schematic view showing the locations of the interconnection blocks on the interior surfaces of the plates forming the housing of the security device.

The physical locations of the interconnection blocks N1-N14 on the interior surfaces of the plates P1-P6 are shown schematically in FIG. 9. As an additional aid to understanding, the locations of the interconnection blocks N1-N14 are also shown in the exploded perspective view of FIG. 2.

Figure 10A:
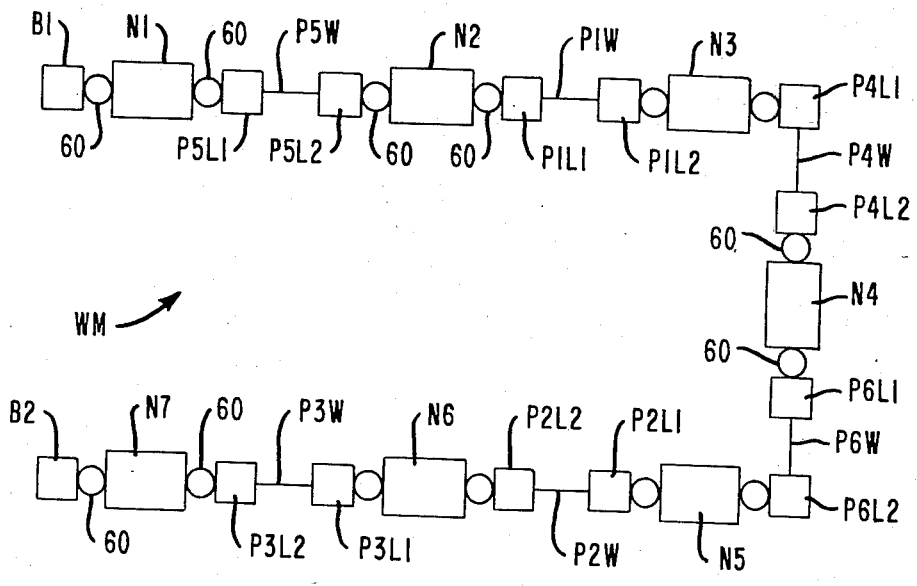
FIGS. 10A and 10B are schematic diagrams showing the manner in which electrical interconnections are made between the plates forming the housing of the security device.
Figure 11:
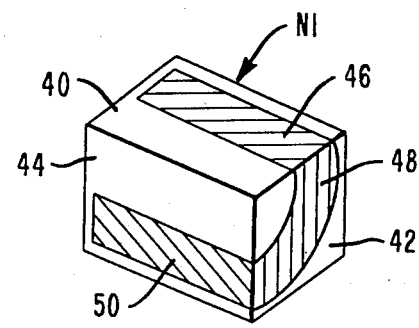
FIG. 11 is a perspective view of an interconnection block.

It will now be described how the wire mesh segments for the six plates P1-P6 are interconnected together using the interconnection blocks N1-N7 to form a wire mesh WM (FIG. 10A).

It should first be noted that in FIG. 10A the small circles 60 represent connections made by conductive bonding, such as bonding by conductive epoxy. Starting from a conductive contact B1 on the PCB 20, the path of the wire mesh WM continues via the interconnection block N1, a conductive island P5L1 (corresponding to the island L1 in FIG. 6B) on the plate P5, the wire mesh segment P5W on the plate P5, a conductive island P5L2 (corresponding to the island L2 in FIG. 6B) on the plate P5, the interconnection block N2, a conductive island P1L1 on the plate P1, the wire mesh segment P1W on the plate P1, a conductive island P1L2 on the plate P1, the interconnection block N3, a conductive island P4L1 on the plate P4, the wire mesh segment P4W on the plate P4, a conductive island P4L2 on the plate P4, the interconnection block N4, a conductive island P6L1 on the plate P6, the wire mesh segment P6W on the plate P6, a conductive island P6L2 on the plate P6, the interconnection block N5, a conductive island P2L1 on the plate P2, the wire mesh segment P2W on the plate P2, a conductive island P2L2 on the plate P2, the interconnection block N6, a conductive island P3L1 on the plate P3, the wire mesh segment P3W on the plate P3, a conductive island P3L2 on the plate P3, the interconnection block N7, to a conductive contact B2 on the PCB 20.

Next, the manner in which the conductive sheets on the six plates are interconnected to form conductive sheet means, conveniently referred to as a "voltage plane" VP, for the housing 11 will be described.

Figure 10B:
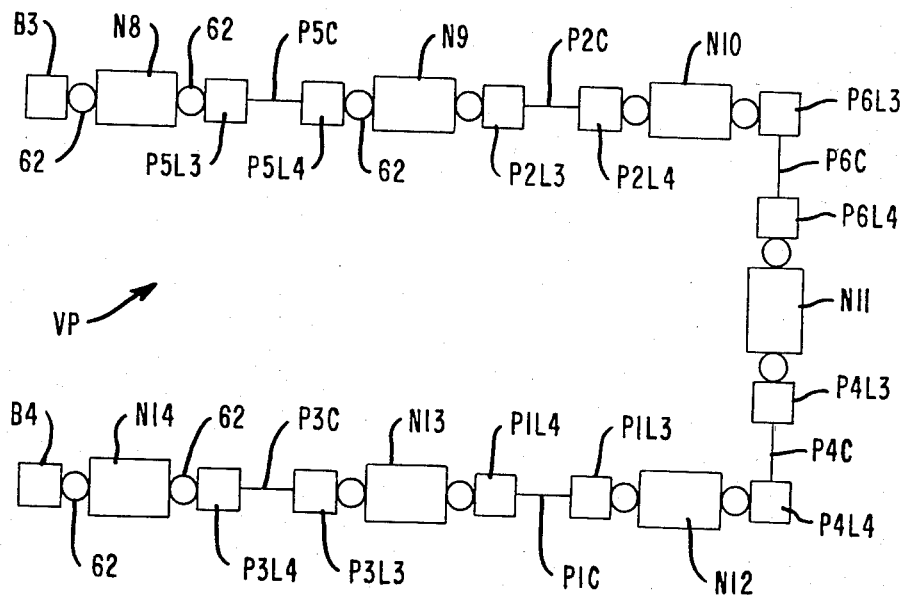

It should again be noted that the small circles 62 in FIG. 10B represent connections made by conductive bonding, such as bonding by conductive epoxy. Starting from a conductive contact B3 on the PCB 20, the interconnection continues via the interconnection block N8, a conductive island P5L3 on the plate P5, the conductive sheet P5C on the plate P5, a conductive island P5L4 on the plate P5, the interconnection block N9, a conductive island P2L3 on the plate P2, the conductive sheet P2C on the plate P2, a conductive island P2L4 on the plate P2, the interconnection block N10, a conductive island P6L3 on the plate P6, the conductive sheet P6C on the plate P6, a conductive island P6L4, on the plate P6, the interconnection block N11, a conductive island P4L3 on the plate P4, the conductive sheet P4C on the plate P4, a conductive island P4L4 on the plate P4, the interconnection block N12, a conductive island P1L3 on the plate P1, the conductive sheet P1C on the plate P1, a conductive island P1L4 on the plate P1, the interconnection block N13, a conductive island P3L3 on the plate P3, the conductive sheet P3C on the plate P3, a conductive island P3L4 on the plate P3, the interconnection block N14, to a conductive contact B4 on the PCB 20.

Figure 12:
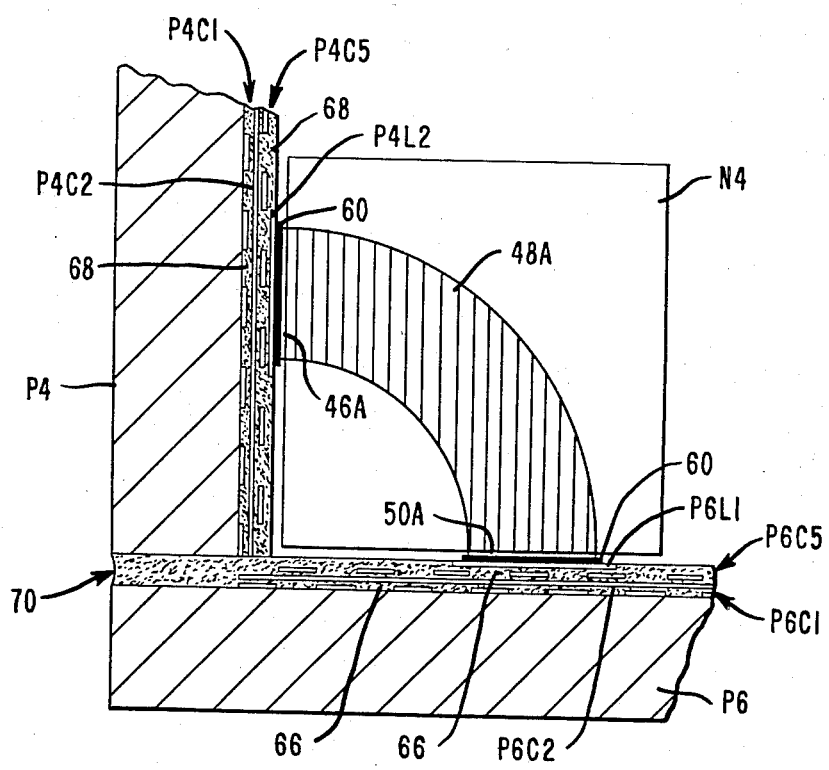
FIG. 12 is a cut-away end view, partially in cross-section, of one of the interconnection blocks in position between two of the plates.

Referring now to FIG. 12, the manner in which a typical one of the interconnection blocks interconnecting two of the plates P1-P6 is located in relation to the two plates with which it is associated, will now be described. By way of example, the location of the interconnection block N4 will be described in relation to the plates P4 and P6. The block N4 has conductive areas 46A, 48A and 50A corresponding to the conductive areas 46, 48 50 of the block N1, FIG. 11. The conductive area 46A is connected via conductive bonding material 60 (see also FIG. 10A) to the conductive island P4L2 on the plate P4. It will be appreciated that, on the plates P4 and P6, the conductive layers C5, C2 and C1 described hereinabove with reference to FIGS. 6D, 6J and 6L are shown and referenced as P4C5, P4C2 and P4C1 on the plate P4 and as P6C5, P6C2 and P6C1 on the plate P6. Furthermore, the conductive layers C6, C4 and C3 previously described with reference to FIGS. 6B, 6F and 6H are not seen on the plates P4 and P6 in the view of FIG. 13. With this in mind, it will be appreciated that the interconnection block N4 is located such that the conductive area 46A is connected by conductive epoxy 60 to the conductive island P4L2 on the plate P4 and the conductive area 50A is connected via conductive epoxy 60 to the island P6L1 on the plate P6. The regions 66 and 68 represent the material of the dielectric layers D1-D5, and the top glass layer G, previously described.

It will be appreciated that even if it were possible to penetrate the housing 11 in the region 70 between the plates P4 and P6, the disposition of the conductive areas 46A, 48A and 50A on the interconnection block N4 would render it extremely difficult to obtain access to the conductive path on the block N4. This provides the additional security afforded by the construction of the interconnection blocks N1-N14 as mentioned hereinabove.

Figure 13:
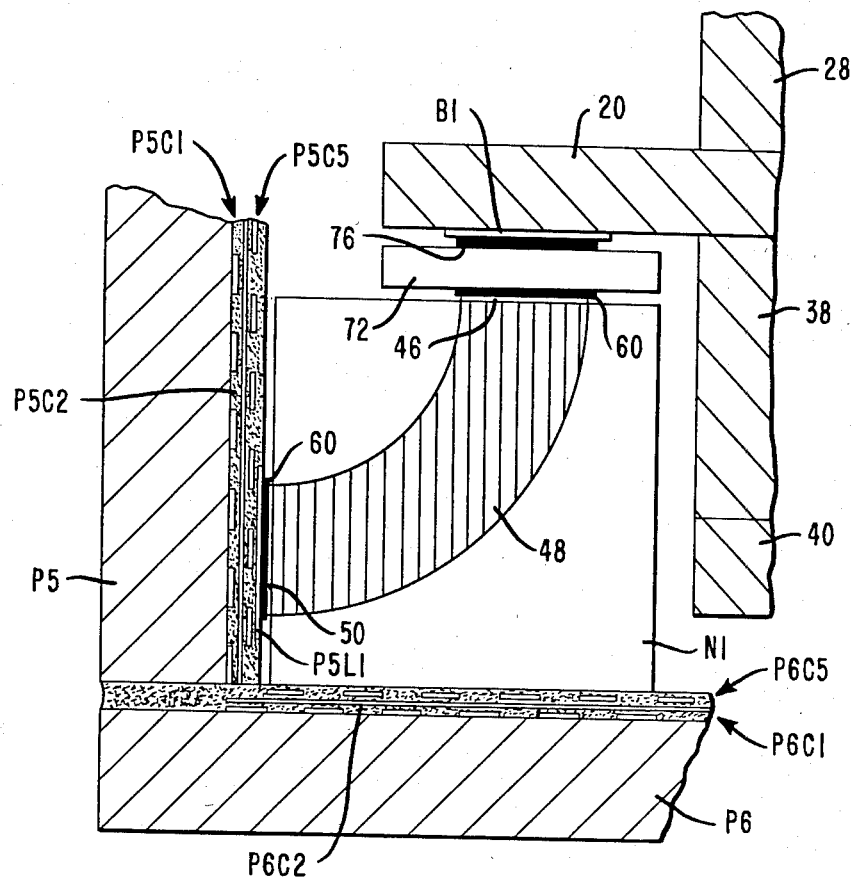
FIG. 13 is a cut-away end view, partially in cross-section, showing one of the interconnection blocks which connects to the printed circuit board.

Referring now to FIG. 13, there is shown an end view including the interconnection block N1, which interconnects the island P5L1 on the plate P5 with the contact B1 on the PCB 20. Conductive layers P5C1, P5C2 and P5C5 are shown for the plate P5 and the conductive layers P6C1, P6C2 and P6C5 are shown for the plate P6. The conductive island P5L1 on the plate P5 is connected via conductive bonding material 60 to the conductive area 50 on the block N1 and the conductive area 46 on the block N1 is connected via conductive binding material 60 to the spacer 72, which is of conductive resilient material, such as conductive rubber. The spacer 72 is connected by conductive bonding material 76 such as conductive epoxy to the contact B1 on the lower surface of the PCB 20. The contact B1 connects to conductive lines (not shown) incorporated in the PCB 20.

Figure 14:
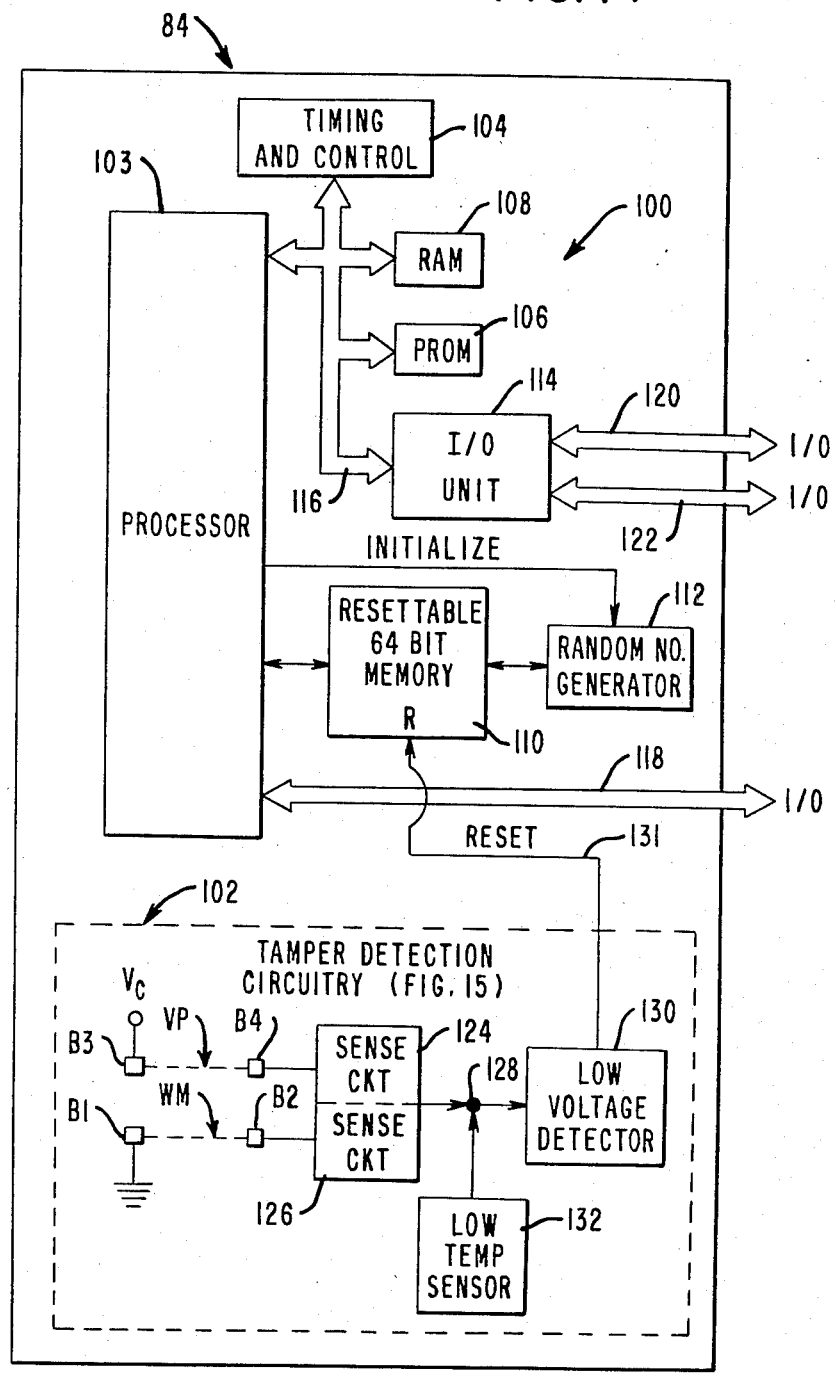
FIG. 14 is a block diagram of the electronic circuitry within the security device.

Referring now to FIG. 14, the electronic circuitry 84 of FIG. 3 will now be discussed in more detail. The electronic circuitry 84 includes data processing circuitry 100 and tamper detection circuitry 102.

The data processing circuitry 100 can be utilized to perform any desired data processing operation in such applications as, for example, electronic payment systems, electronic fund transfers, data encryption/decryption, PIN (personal identification number) verification, data transmission/reception, access control and home banking. The data processing circuitry 100 includes a processor 103 for selectively controlling the operation of the electronic circuitry 84 in response to input data and instructions, a timing and control circuit 104 for controlling the operation of the processor 103, a programmable read only memory (PROM) 106 for storing the software program to be executed by the processor 103, a random access memory (RAM) 108 for providing a temporary memory storage, a volatile memory 110 for permanently storing the most sensitive or secure data such as a key storage key (KSK) (to be explained hereinafter), a random number generator 112 and an input/output (I/O) unit 114.

A data, control and address bus 116, bidirectional I/O bus 118 and I/O lines 120 and 122 are coupled to the processor 103, timing and control circuit 104, PROM 106, RAM 108 and I/O unit 114 to enable the data processing circuitry 100 to perform its data processing operations. Data may be passed over bidirectional I/O bus 118 to or from the processor 103 and over I/O lines 120 and 122 to or from the I/O unit 114. The remote ends of the I/O bus 118 and I/O lines 120 and 122 may be selectively coupled to, for example, another data processor (not shown), a main computer (not shown) and a peripheral (such as a keyboard) (not shown) via the flexible member 12 (FIG. 1) in order to enable the data processing circuitry 100 to perform its preselected operations.

Power to operate the electronic circuitry 84 is preferably supplied from external power sources (not shown), such as power supplies and batteries, connected via the flexible member 12 (FIG. 1).

An initialization subroutine, contained in the software program stored in the PROM 106, is executed in a special mode of operation controlled by an authorized person. Preferably, this initialization subroutine can only be executed once after the security device 10 (FIG. 1) has been completely assembled.

For purposes of additional security it is preferable that the volatile memory 110 be, for example, a resettable memory such as a 64-bit shift register memory.

During the execution of an INITIALIZE subroutine, the processor 103 applies an INITIALIZE signal to the random number generator 112 to enable the generator 112 to generate a random number which is stored in the memory 110 as an exemplary sequence of 64 random bits. This sequence of 64 random bits is the KSK (key storage key), which is the most sensitive or secure data contained in the data processing circuitry 100. The KSK is utilized to encrypt keys which are to be entered into the security device 10 for storage in the RAM 108.

Such keys are then used in data encryption operations. The precise manner in which the KSK is utilized is not of significance to the present invention and will, therefore, not be further described herein. It should, however, be noted that the resettable memory 110 stores the KSK, that the contents of the memory 110 cannot be altered (if the security device 10 was programmed to run the initialization program only once), that the KSK is never outputted to the outside world from the security device 10, and that for purposes of security external access to the KSK contents of the memory 110 by various means must be prevented.

Tamper detection circuitry 102 is included in the electronic circuitry 84 to specifically actively destroy the KSK in the resettable memory 110 if there is any attempt to penetrate the housing 11 of the security device 10 to gain access to the KSK stored in the memory 110. It should be realized that if the KSK is destroyed, any encrypted data or keys stored in RAM 108 become meaningless or useless. Two principal ways that someone could employ to attempt to gain access to the KSK stored in the resettable memory 110, as well as the reaction of the tamper detection circuitry 102 to such attempts, are discussed below.

An attempt to penetrate the ceramic housing 11 of the security device 10 may be made by drilling into or cracking the housing 11. To protect against this possibility, the voltage plane VP of FIG. 10B is connected between a supply voltage $V_C$ and a sense circuit 124, while the wire mesh WM of FIG. 10A is connected between a reference potential such as ground and a sense circuit 126. An attempt to drill into or crack the housing 11 that interrupts the wire mesh WM causes sense circuit 126 to generate a low voltage signal at point 128. Similarly, if the wire mesh WM is shorted to the voltage plane VP by such an attempt, the sense circuit will generate a low voltage signal at point 128. In response to a low voltage signal at point 128, a low voltage detector 130 generates a RESET signal on a line 131 to reset the memory 110 thereby actively clearing or destroying the KSK in the resettable memory 110.

It is known that it is possible to retain data in static CMOS cells of a memory in an unpowered state (no supply voltage or battery voltage present), if those cells are initially frozen below −90 degrees centigrade before power is removed from the memory 110. If this were done, it could be possible to subsequently forcibly break into the security device 10 and read out the "frozen" contents of the memory 110.

A low temperature sensor 132 is therefore provided in the tamper detection circuitry 102 to protect the security device 10 (FIG. 1) against the above-described tampering at extremely low temperatures. The sensor 132 is also connected to point 128. Sensor 132 is so implemented that when the temperature within the housing 11 (FIG. 1) falls to, for example, −25 degrees centigrade, the sensor 132 generates and applies a low voltage signal to point 128. This low voltage signal applied from sensor 132 to point 128 will also cause the low voltage detector 130 to generate a RESET signal on the line 131 to reset the memory 110 to actively clear or destroy the KSK in the memory 110.

Figure 15:
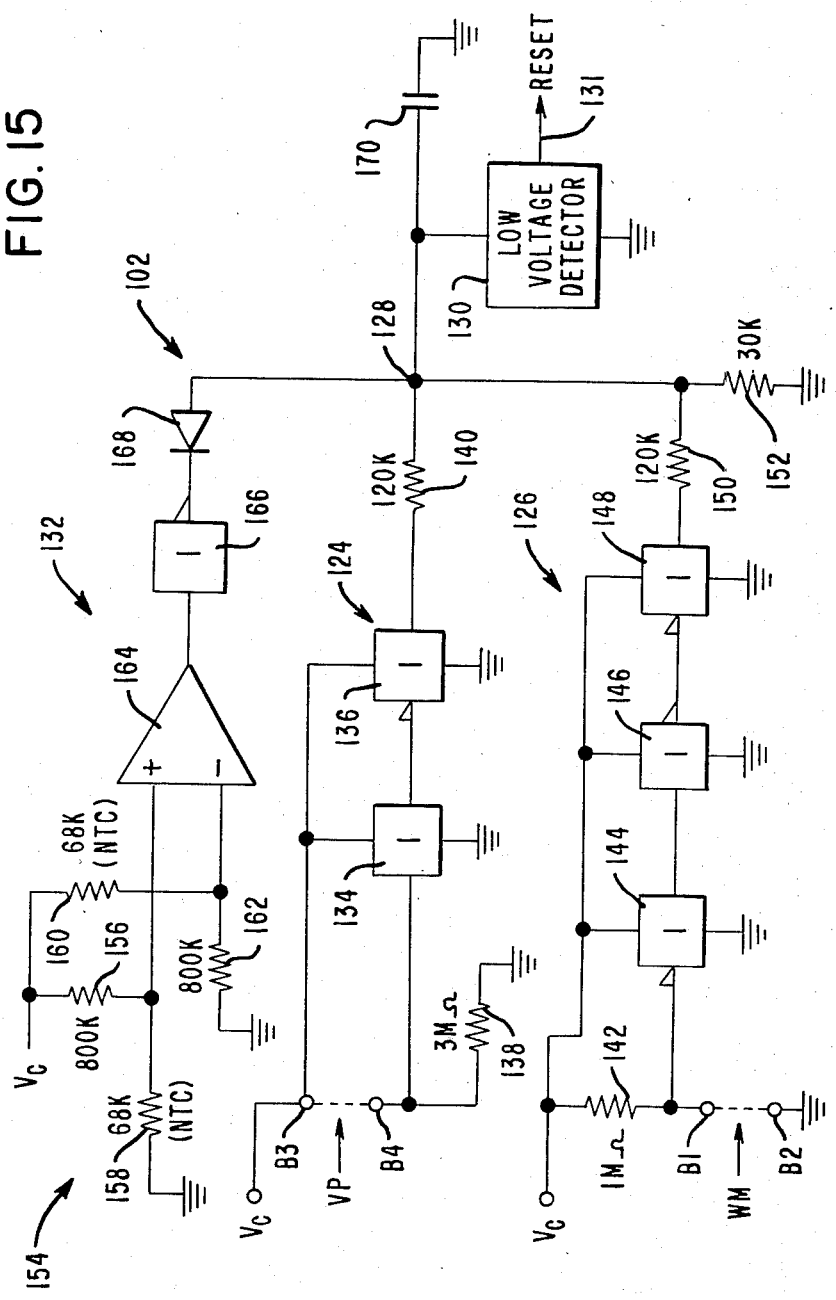
FIG. 15 is a circuit block diagram of the tamper detection circuitry of FIG. 14.

Referring now to FIG. 15, the tamper detection circuitry 102 will now be described in more detail. The tamper detection circuitry 102 essentially includes four parts. The first part includes voltage plane VP and sense circuit 124. The second part includes wire mesh WM and sense circuit 126. The third part includes the low temperature sensor 132. All of the first, second and third parts are connected to a common output at point 128 which, in turn, is connected to the fourth part which includes the low voltage detector 130. Consequently, if any of the first, second or third parts detects any attempt to gain access to the KSK in memory 110 (FIG. 14) a low output is developed at point 128. As mentioned before, such a low output at point 128 will cause the low voltage detector 130 to actively reset the memory 110 to destroy the KSK stored therein.

In the first part, contact 84 of VP is coupled to sense circuit 124. A high or positive supply voltage $V_C$ is applied to contact B3 of VP and to each of cascaded inverters 134 and 136 in sense circuit 124. For purposes of this discussion assume that $V_C = +4.5$ volts. A three megohm resistor 138 is connected between contact B4 of VP and a low reference potential such as ground. Contact B4 is also connected to the input of the inverter 134. The output of inverter 136 is applied through a 120 kilohm resistor 140 to point 128.

When the voltage plane VP is not shorted to the wire mesh WM, the input to inverter 134 is high, the output of inverter 134 is low and the output of inverter 136 is high.

In the second part, contact B1 of WM is coupled to sense circuit 126 and contact B2 of WM is connected to the low reference potential or ground. A one megohm resistor 142 is connected between contact B1 of WM and $V_C$. The supply voltage $V_C$ is also applied to cascaded inverters 144, 146 and 148. Contact B1 is also connected to the input of inverter 144 which, in turn, has its output connected to the input of inverter 146. The output of inverter 146 is then connected to the input of inverter 148. The output of inverter 148 is applied through a 120 kilohm resistor 150 to point 128. A 30 kilohm resistor 152 is connected between point 128 and ground to develop a common output for the sense circuits 124 and 126, as well as to the low temperature sensor 132 (to be explained hereinafter).

When WM is undamaged (not broken or shorted to either $V_C$ or VP), the input to inverter 144 is low, the output of inverter 146 is low and the output of inverter 148 is high.

The third part includes the low temperature sensor 132 (FIG. 14). The low temperature sensor 132 includes: a negative temperature coefficient (NTC) bridge circuit 154 which includes serially-connected resistors 156 and 158 coupled between $V_C$ and ground, and serially-connected resistors 160 and 162 respectively coupled between $V_C$ and ground; an operational amplifier 164 having its non-inverting input (+) connected to the junction of resistors 160 and 162 and its inverting input (−) connected to the junction of resistors 160 and 162; an inverter 166 for inverting the output of the operational amplifier 164; and a diode 168 coupled between the output of inverter 166 and the point 128.

The resistors 160 and 162 may be 800 kilohm resistors, while the resistors 158 and 160 may be 68 kilohm resistors having negative temperature coefficients (NTC). With this implementation the bridge circuit 154 would be unbalanced until the temperature inside the housing 11 reaches approximately −25 degrees C. It can be readily seen that when the bridge circuit 154 is unbalanced, the operation amplifier 164 develops a low output which is inverted by inverter 166 to backbias the diode 168. Therefore, when the temperature inside the housing 11 (FIG. 1) is above −25 degrees centigrade, the low temperature sensor 132 is effectively disconnected by the backbiased diode 168 from the point 128.

The fourth part includes a low voltage detector 130 connected to point 128 for developing the RESET signal on the line 131 when the potential across resistor 152 is below a preselected threshold voltage of, for example, +1.15 volts when $V_C = +4.5$ volts, a capacitor 170 connected between point 128 and ground for retaining the input potential (voltage developed across resistor 152) to the detector 130 for a sufficient time to enable the detector 130 to generate a RESET signal when the potential across resistor 152 falls below +1.15 volts. The low voltage detector 130 may be a voltage comparator which develops a low output when the voltage across resistor 152 falls below an internal reference potential of +1.15 volts.

Various conditions will now be discussed:

(1) When no attempt has been made to freeze and/or penetrate the housing 11 to gain access to the KSK in the resettable memory 110 (FIG. 14) the temperature in the housing 11 (FIG. 1) will be high enough not to trigger the low temperature sensor 132 and the wire mesh WM will be undamages. As a result, the outputs of inverters 136 and 148 will both be high. Therefore, the voltage developed across resistor 152 (approximately +1.15 volts) will be above the 1.15 volt threshold of the low voltage detector 130. Consequently, the low voltage detector 130 will not develop the RESET signal.

(2) When the voltage plane VP is shorted to ground, contact B4 goes to a low potential, causing the input to inverter 134 to go low. This low input is inverted to a high signal by inverter 134. The high signal (+4.5 volts) from inverter 134 is inverted by inverter 136 to a low signal (0 volts). Assume that WM is not broken at this time and therefore that inverter 148 develops a high output (+4.5 volts). As a result, a voltage divider including resistors 140, 150 and 152 will cause point 128 to fall to approximately +0.9 volts. Since +0.9 volts is below the +1.15 volt threshold of the low voltage detector 130, the low voltage detector 130 will develop the RESET signal to actively reset memory 110 (FIG. 14).

(3) When WM is broken or shorted either to $V_C$ or VP, contact B1 goes high (+4.5 volts). This high signal is inverted by inverter 144. The low signal (0 volts) from inverter 144 is inverted by inverter 146. The high signal from inverter 146 is inverted by inverter 148. The voltage divider comprised of resistors 140, 150 and 152 will cause point 128 to fall to approximately +0.9 volts. This will then cause the low voltage detector 130 to develop the RESET signal to reset memory 110 (FIG. 14).

(4) If VC falls below +3.5 volts, the voltage across capacitor 170 will fall below +1.15 volts. This again will cause the low voltage detector 130 to generate the RESET signal on the line 131.

(5) When the temperature in the housing falls below −25 degrees centigrade, the bridge circuit 154 in the low temperature sensor 132 becomes either balanced or unbalanced in the opposite direction. In either event, the operational amplifier 164 develops a high output which is inverted by inverter 166. The low output (0 volts) from inverter 166 forward biases diode 168 causing point 128 to fall toward 0 volts. This will cause the charge across capacitor 170 to fall toward 0 volts. However, as soon as the voltage across capacitor 170 falls below +1.15 volts, the low voltage detector 130 generates the RESET signal on the line 131 to clear the memory 110.

It will be seen that the invention thus provides a security device 10 for the secure storage of sensitive data. It provides protection for the device 10 against chemical attack, physical attack, and tampering at extremely low temperature. The ceramic housing cannot be penetrated by chemicals, since ceramic material will not dissolve. Physical attack by cutting or drilling will result in the ceramic housing 11 cracking or breaking, thus breaking or damaging the wire mesh WM or shorting the wire mesh to the voltage plane VP. As mentioned above, it will be appreciated that if a hole is made in one of the plates P1-P6, at least one of the conductive path segments thereon, together with the conductive sheet thereon, will be interrupted. Furthermore, attempts to utilize a conductive fluid to bypass interruptions of the wire meshes will result in a short circuit between the wire mesh WM and the voltage plane VP. The tamper detection circuitry 102 then actively resets the resettable memory 110 to destroy the sensitive data stored therein. Similarly, any attempt to tamper with the security device 10 at an extremely low temperature will also cause the temper detection circuitry 102 to actively reset the memory 110.

Modifications of the security device are possible without departing from the true spirit and scope of the invention as defined in the appended claims. For example, on the plates forming the housing, the conductive sheet could be located so as to overlie both the conductive path segments instead of being located between them. Also, the connections of the power supply VC and ground potential to the voltage plane VP and the wire mesh WM could be interchanged.

In another modification, additional ceramic blocks could be provided to protect the top surface and edge of the PCB 20 where the PCB 20 protrudes from the inner ceramic box 42. Alternatively, if a slightly lower degree of security is acceptable in a particular application, the inner ceramic box 42 could be omitted from the device.

We claim:

1. A security device for protecting stored sensitive data comprising:

a closed housing containing memory means adapted to store sensitive data including conductive path means and conductive sheet means;

said conductive path means including a plurality of interconnected first and second conductive path segments;

said conductive sheet means including a plurality of interconnected conductive sheets;

each of said first conductive path segments, an associated second conductive path segment and an associated conductive sheet being arranged in superposed relationship and being separated by insulating material;

and tamper detection circuitry connected to said conductive path means and said conductive sheet means including a reset signal generating means arranged to provide a reset signal to erase the contents of said memory means in the event of interruption of said conductive path means or electrical interconnection between said conductive path means and said conductive sheet means brought about by an attempt to penetrate said housing.

2. A security device according to claim 1, wherein each of said conductive sheets is located between the associated first and second conductive path segments.

3. A security device according to claim 1, wherein said first and second conductive path segments are arranged in respective winding configurations with associated first and second conductive path segments being configured such that the first conductive path segment overlies the spacing of the associated second conductive path segment and the spacing of the first conductive path segment overlies the associated second conductive path segment.

4. A security device according to claim 1, wherein said housing includes a plurality of individual plates connected together to form said housing, and in that said first and second conductive path segments and said conductive layers are disposed on said plates with the first and second conductive path segments on each plate being serially connected to form a wire mesh segment, the device including interconnection means serially interconnecting the wire mesh segments for the plates to form said conductive path means and serially interconnecting the conductive sheets for said plates to form said conductive sheet means.

5. A security device according to claim 4, wherein said conductive path segments have a width and spacing of approximately 300 microns.

6. A security device according to claim 4, wherein said interconnection means include a plurality of individual interconnection devices each in the form of a multi-sided block having first, second and third conductive areas disposed on respective first, second and third surfaces thereof to form a continuous conductive path from said first conductive area via said second conductive area to said third conductive area.

7. A security device according to claim 1, wherein said tamper detection circuitry includes first and second sensing means connected respectively to said conductive sheet means and to said conductive path means to provide respective first and second control signals, and wherein said reset signal generating means is connected to said first and second sensing means and is adapted in response to either of said first and second control signals to generate said reset signal.

8. A security device according to claim 7, wherein said conductive sheet means has a first terminal connected to power supply means and a second terminal thereof connected to said first sensing means and through a first resistor to a reference potential, and wherein said conductive path means has a first terminal thereof connected to said second sensing means and through a second resistor to said power supply means, and a second terminal thereof connected to said reference potential.

9. A security device according to claim 8, wherein said memory means includes a resettable shift register adapted to be reset by said reset signal.

* * * * *